Jan. 3, 1950 H. SUSSMAN 2,493,093
RADIO RECEIVER SYSTEM
Filed Feb. 28, 1946
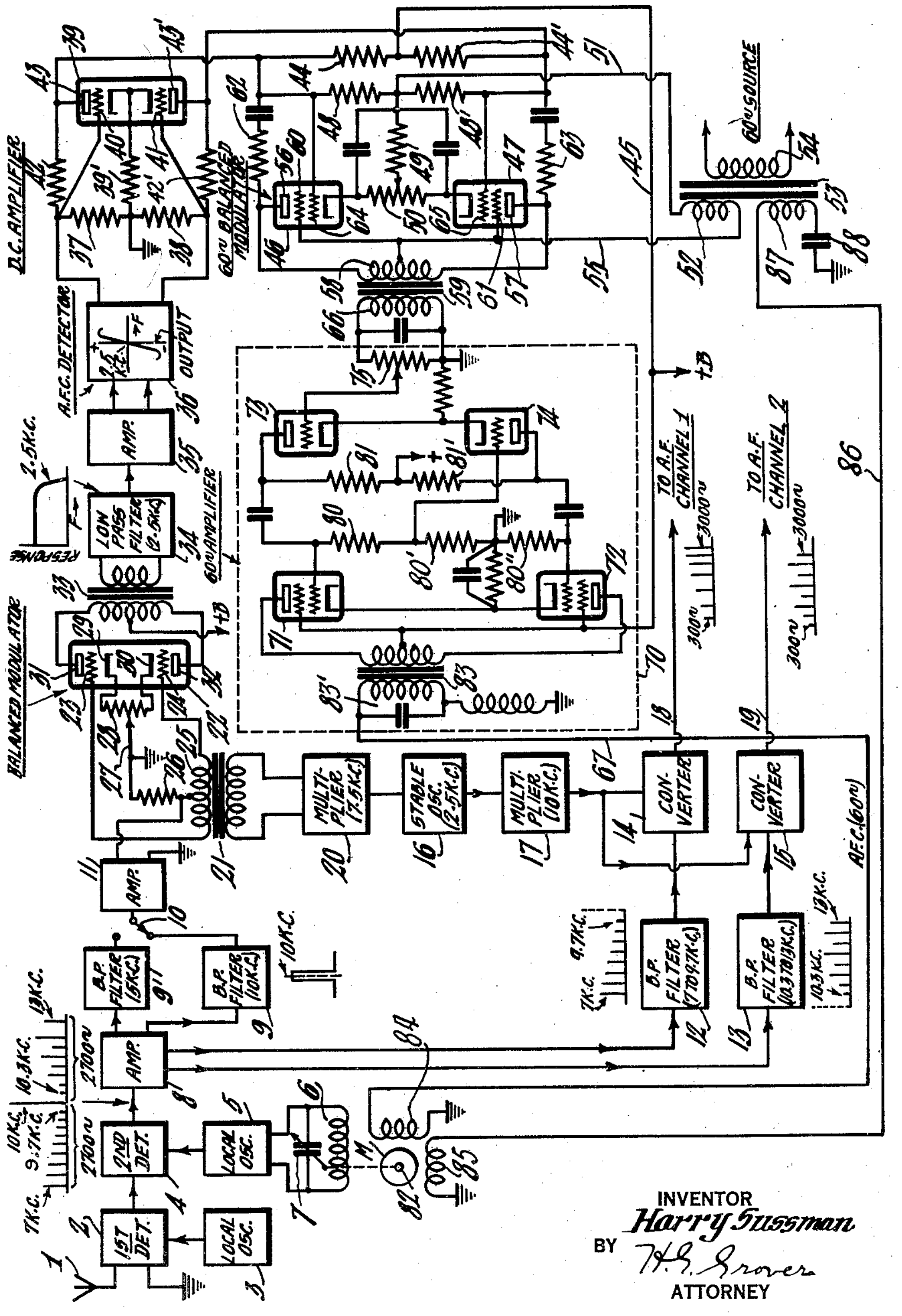
INVENTOR
Harry Sussman
BY H. S. Grover
ATTORNEY Patented Jan. 3, 1950 2,493,093

UNITED STATES PATENT OFFICE 2,493,093

RADIO RECEIVER SYSTEM

Harry Sussman, Little Neck, N. Y., assignor to Radio Corporation of America, a corporation of Delaware Application February 28, 1946, Serial No. 650,954

7 Claims. (Cl. 250—9)

My present invention relates generally to radio receivers of the single side band communication type, and more particularly to an improved radio receiver system adapted to receive signals from a single side band transmitter with carrier partially or wholly suppressed.

An important object of my invention is to provide a novel receiver of carrier energy whose modulation consists of upper and lower sidebands which are respectively of different character; the receiver including means for discriminating between the separate modulation side bands of the received carrier.

Another object of my invention is to improve the operation of single side band receivers of the type utilizing a partially suppressed carrier, wherein the receiver utilizes a stable low frequency oscillator which is employed to perform two functions, viz., to coact with energy derived from the partially suppressed carrier for automatically controlling the frequency of a carrier restoration oscillator, and to coact with side band energy to produce energy of the desired modulation frequency.

A more specific object of my invention is to provide a system of radio signalling wherein the respective upper and lower side bands of a partially, or totally, suppressed carrier are of different modulation character, the receiver employing means for cooperating with suppressed carrier energy automatically to control the frequency of an oscillator of the system, as well as to provide a method of discriminating between the aforesaid different modulation side bands.

Still further objects of my invention are generally to improve the efficiency and reliability of single side band communication receivers, and more specifically to provide a single side band receiving system which is economical in operation and easily manufactured and assembled.

Still other features and objects of my invention will best be understood by reference to the following description, taken in connection with the drawing, in which I have indicated diagrammatically a system whereby my invention may be carried into effect.

Referring now to the accompanying drawing, I have shown in schematic form a complete receiving system embodying various features of my present invention. Such of the networks as are well known to those skilled in the art of radio communication are represented by rectangles, since it is not believed necessary to show such well known circuits in detail. Furthermore, various representations have been employed to denote the symbolic appearance of component frequencies existing in the respective upper and lower modulation side bands of the received signal energy.

While it is assumed that the received radio signals are transmitted in a range of 2 to 20 megacycles (mc.), it is to be clearly understood that my invention is in no way restricted to that particular frequency range. It has, also, been assumed that reception takes place with amplitude modulated carrier waves wherein a carrier, say of a frequency in the 2 to 20 mc. range, is amplitude modulated by at least one source of modulation signals. The specific illustration employed in the present receiving system is that wherein the carrier has been modulated from two sources of different modulation signals, but my invention is in no way restricted to such multiplex signalling.

It will be understood that in the case of modulation of the carrier by a single source of modulation signals, only one of the side bands need be selected and will exist on the transmitted radio signals. In the case of multiplexing, there will exist respective upper and lower side bands which correspond to respectively different modulation signals. Before describing the receiving system, it is pointed out that those skilled in the art of radio communication are fully aware of the means needed to generate and transmit the amplitude modulated waves of this system.

By way of example, let it be assumed that two different sources of modulation frequencies are employed, and each of them extends over a range of 300 to 3,000 cycles, but that they are of different intelligence character. Let it, also, be assumed that the carrier (10 mc.) has been modulated at the transmitter from both sources of modulation signals, and that the output of each modulator has been passed through respective filters, one passing only the upper side band, the other passing only the lower side band. Considering the case of partial suppression of the carrier, it will be understood that the carrier component will be included in the complete modulated wave, but at a reduced amplitude. This modulated carrier energy with partially suppressed carrier component is then applied to the main amplifier and radiated. It is pointed out that the respective upper and lower side bands of the different modulation signals may all be located above the carrier component. For example, the carrier component may be displaced 5 kc. below the frequency of the original carrier frequency of 10 mc. For complete carrier suppression transmission, a special pilot frequency of 5 kc. or 10 kc. may be added to the modulation components. In other words, a pilot tone of 5 or 10 kc. may be applied to the modulation spectrum of the wave at the transmitter, where the carrier is completely suppressed.

In the drawing the numeral 1 denotes any suitable form of signal collection device, such as a grounded antenna system, a dipole, or a radio frequency transmission line. The collected amplitude modulated signal energy may be subjected to selective high frequency amplification prior to application to any suitable first detector, or converter, 2. The numeral 3 denotes a suitable local oscillator which provides energy to heterodyne the received modulated carrier energy so as to provide intermediate frequency (I. F.) energy of a suitable value, as for example 1 mc. (1,000 kc.). This I. F. energy is applied to any well known form of demodulator, or second detector, 4 which is fed with local oscillations from any suitable local oscillator 5.

The second detection step is for the purpose of developing modulated beat energy. Hence, the local oscillator 5 will be adjusted to operate at a frequency, either lower or higher than the operating I. F. value, such that its energy will heterodyne with the I. F. energy to produce a reduced frequency modulated signal of 10 kc. If the I. F. signal is to be 1,000 kc., the local oscillator 5 may be set to operate at a frequency of 1010 kc., or it may operate at 990 kc.

The oscillator 5 is provided with a frequency determining tank circuit 6 which has an adjustable reactance 7 adapted to be varied for the purpose of setting the operating frequency of the oscillator. The oscillator 5 may be of any suitable construction, and the reactance 7 is specifically disclosed as a variable tuning condenser. The function of the oscillator 5 is to supply a carrier-representative component for the signal wave energy. This is readily seen by considering the frequency components of the signal energy output at the output terminals of second detector 4. The representation of the frequency components is purely symbolic and illustrative.

To one side of the 10 kc. component are the frequency components of the lower side band of one of the two different modulation signals, while on the other side of the 10 kc. frequency are the frequency components of the upper side band of the second of the modulation signals. Both side bands are assumed to extend respectively over a band of 300 to 3000 cycles, i. e., 2700 cycles. Any other frequency could, of course, be assumed. The lower side band, therefore, exists in the 7 kc. to 9.7 kc. band of the modulated output energy of second detector 4, while the upper side band exists in the 10.3 kc. to 13 kc. band. If the carrier is partially suppressed at the transmitter, the oscillator 5 causes a restoration, or augmentation, of the amplitude of the 10 kc. component. If the carrier was suppressed completely at the transmitter, then the 10 kc. pilot tone component at the output of second detector 4 is reinforced by oscillator 5. This system provides a method for counteracting the effects of "selective fading," which causes relative fading between the carrier and its side bands.

This system requires rigid maintenance of oscillator 5 at its operating frequency, because if for any reason the frequency of oscillator 5 varies then the beat note frequency 10 kc. of the second detector 4 will change. Hence, in accordance with one aspect of my present invention I provide an automatic frequency control (AFC) system which functions to adjust the magnitude of capacitance 7 in a direction and to a degree such as to maintain the signal output of second detector 4 at a 10 kc. frequency. An examination of the frequency components illustrated above the second detector 4 will reveal that it is of great importance in this type of communication system to apply rigid AFC to local oscillator 5. The frequency component diagram reveals that the lower and upper side bands are of different modulation character, and that the carrier-representative component of 10 kc. is located between the side bands.

In accordance with a second aspect of my invention, I provide a pair of independent band pass filters 12 and 13 for respectively selecting the lower and upper side bands of the output energy of second detector 4. I feed the lower and upper side bands to respective converters 14 and 15 which are respectively heterodyned with 10 kc. signal energy derived from a stable oscillator. The outputs of the converters correspond to the desired modulation signals, and accordingly, there is provided a method of discriminating between the different modulation signals existing at the output of detector 4.

So far as the AFC system is concerned, the 10 kc. component at the output of detector 4 is selected out by a suitable narrow band filter 9 which functions to suppress any of the side band components. Energy of 7.5 kc. frequency is supplied from a stable oscillator 16 of 2.5 kc. The filtered 10 kc. tone is heterodyned with 7.5 kc. energy to provide a resulting 2.5 kc. control frequency which is available for AFC of the oscillator 5, or oscillator 3 if desired. Changes in frequency of either of these oscillators, or the suppressed carrier at the transmitter, will result in an equivalent displacement in the frequency of the side band components. Evidence of any such frequency deviation appears in the departure of the 10 kc. component which is transmitted through the narrow band filter 9. As will be shown in detail at a later point, I translate such frequency deviations into a corresponding deviation of a 60 cycle voltage which is used to operate and control a two-phase motor M functioning to adjust the variable frequency adjusting condenser 7.

Another aspect of my invention involves the utilization of stable oscillator 16 to supply the 7.5 kc. signal required for AFC conversion and the 10 kc. signal required for converting the side band components of the output of detector 4 to audio frequency signals equivalent to the original signals at the transmitter. By controlling these frequencies from a single 2.5 kc. source, the frequency deviation in the output frequency due to frequency change in the 2.5 kc. signal will be exactly equal to that which occurs in the 2.5 kc. signal. This results in a smaller percentage frequency error in the received audio signals.

Returning now to a specific consideration of the circuit provided for performing the aforesaid functions, it will be noted that the amplifier 8 is used to amplify the modulated 10 kc. energy output of second detector 4, and it is to be understood that any suitable amplification may be employed. The output energy of the amplifier network 8 is divided into four separate portions. A portion of the amplified energy is applied to a narrow band pass filter 9 which passes solely the energy of 10 kc. and suppresses substantially completely the lower and upper side band energy. The numeral 9′ denotes an alternative narrow band pass filter which is provided where the carrier-representative component is 5 kc. For this reason a switch 10 is utilized for supplying the subsequent amplifier 11 with filtered energy from either of the band pass filters 9 or 9'.

Since it has been assumed that the beat frequency for the present specific case is 10 kc., the switch 10 is shown connected to transmit the 10 kc. component from band pass filter 9 to the amplifier 11. Below the filter 9 I have shown an illustrative narrow band representation to denote the fact that the output of the filter network 9 is free of the lower and upper side bands. Those skilled in the art of radio communication will be able to design suitable narrow filters composed of inductance and capacity for performing the function of network 9.

Before describing the further utilization of the filtered 10 kc. component for AFC purposes, there will first be described the manner of separating the lower and upper side band energy from the 10 kc. components. Two separate fractions of the output of amplifier 8 are applied to respective band pass filters 12 and 13. The band pass filter 12 passes the lower side band energy which extends from 7 to 9.7 kc. On the other hand, the band pass filter 13 passes the upper side band energy which extends from 10.3 to 13 kc. Those skilled in the art will readily be able to design suitable filters for selecting the respective lower and upper side bands. It is to be understood that at the output terminals of each of filters 12 and 13 the 10 kc. component is completely suppressed.

I have shown above and below the respective networks 12 and 13 frequency component diagrams to illustrate the frequency components passing the respective filters 12 and 13. The filtered lower side band energy of network 12 is applied to converter 14, while the filtered upper side band energy of network 13 is applied to converter 15. There is, also, supplied to each of converters 14 and 15 heterodyning local oscillations derived from the stable oscillator 16. The oscillator 16 is adjusted to operate to produce stable oscillations at 2.5 kc. The network at 16 functions as a very steady oscillator, and by operating at a relatively low frequency of 2500 cycles there is provided a reference frequency which will be highly dependable, and there will be little likelihood of frequency shift at that point.

The output of oscillator 16 is applied through the frequency multiplier 17 which steps up the frequency of the oscillations four times so that the output of the multiplier 17 has a frequency of 10 kc. This multiplied energy is applied to the converter 14 as a local oscillation. Furthermore, the output of multiplier 17 is, also, applied to converter 15 as a local oscillation. It will be obvious that when the lower side band of 7 to 9.7 kc. is heterodyned with the local oscillations of 10 kc., there will be provided beat energy extending over the range of 300 cycles to 3,000 cycles. In other words, the frequency components of the lower side band will be inverted to the original modulation signal form which existed at the transmitter. This is, also, true in the upper side band components, and here, again, the inversion will occur to the original modulation signal form.

I have depicted frequency component diagrams above the output leads of converters 14 and 15 which represent the original audio modulation signal corresponding to the two audio frequency sources. It is indicated that the line 18 is "A. F. channel 1," while the line 19 is "A. F. channel 2." Any suitable modulation signal utilizing device may be employed at the lines 18 and 19. It will, also, be obvious that the receiving arrangement described thus far is equally applicable to the case whether two side bands exist on the radiated carrier, or only one side band.

The output of the stable oscillator 16 is additionally multiplied by a separate frequency multiplier 20 which steps up the frequency three times. In other words, the energy output of multiplier 20 is at 7.5 kc., and this multiplied frequency energy is applied through transformer 21 in push-pull relation to the control grids of a balanced modulator circuit. These control grids of the balanced modulator have applied to them in parallel relation the filtered 10 kc. component output of the amplifier 11. It is to be clearly understood that my invention is in no way restricted to any particular circuits for the networks described up to this point. Those skilled in the art of radio communication are fully aware of circuits which will function as required with the various networks associated with the stable oscillator 16, as well as those associated with the filters 12, 13 and the respective converters 14 and 15.

The balanced modulator is illustrative of one form of converter for converting the 10 kc. component, or pilot tone, to a control frequency of 2.5 kc. Any other suitable and well known form of frequency conversion network may be utilized. In the present case the modulator tube is a triode tube 22, whose respective control grids 23 and 24 are connected to the opposite ends of the secondary winding 25 of transformer 21. The ungrounded output terminal of amplifier 11 is connected through resistor 26 to the grounded adjustable slider 27 of the common potentiometer resistor 28 connected between the respective cathodes 29 and 30. The plates 31 and 32 are connected respectively to the opposite ends of the primary winding of output transformer 33, and a suitable positive potential is applied from a source +B to the mid-point of the primary winding.

The action of the balanced modulator circuit is well known. There will be produced in the common output circuit of tube 22 various frequency components including a 2.5 kc. frequency component. For the purposes of the present application it is believed sufficient to point out that by applying the 10 kc. component in like phase to grids 23 and 24, and the 7.5 kc. component in opposed phase relation, the output of the modulator has produced therein modulation components of the two input frequencies. I utilize a low pass filter 34 for suppressing all the modulation components in the output of the balanced modulator above 2.5 kc. The low pass filter may be of any suitable construction, and the response curve thereof is shown above the filter network. The filtered 2.5 kc. component is suitably amplified by amplifier 35, and is then available for utilization by the AFC motor control circuit.

The control energy of 2.5 kc. is applied to an AFC detector 36 which functions to translate frequency deviations of the input energy at the detector input terminals into corresponding direct current variations at the detector output load resistor. While the AFC detector 36 may be of any suitable construction, I prefer to use the type of detector circuit disclosed and claimed by Gerald Jacobs in application Serial No. 560,560, filed October 27, 1944. The discriminator input circuit of the detector in that case is free of inductance, and consists of low pass filter and high pass filter resistance-capacity circuits. The outputs of these filters are fed to a pair of opposed diode rectifiers having respective load resistors connected so that the rectified voltages thereacross are in polarity opposition. The numerals 37 and 38 indicate the respective load resistors of the said opposed diode rectifiers, and the junction of resistors 37 and 38 is grounded.

The box 36, schematically indicating the AFC detector, has displayed a typical characteristic curve relating frequency deviations (F) of the detector input energy from the predetermined 2.5 kc. frequency to detector output voltage. The peaks of the FM detection characteristic are equidistantly spaced from the 2.5 kc. value, and are very close to the latter so that a rigid control over frequency deviation may be secured. At a signal input of 2.5 kc. at the input terminals of FM detector 36, the direct voltage output across each of load resistors 37 and 38 will be equal. Should the frequency of the output of low pass filter 34 shift from 2.5 kc., then there would be a greater voltage drop across one load resistor than the other. The direction of change would be dependent on the sense of frequency deviation. Hence, there is provided a direct current voltage at the output load of each FM detector diode whose magnitude and direction of polarity change are dependent respectively on the extent and sense of frequency deviation of the signal energy, at the FM detector input, from 2.5 kc.

The direct current voltages across resistors 37, 38 are amplified by a direct current voltage amplifier comprising a twin triode tube 39 whose control grids 40 and 41 are respectively connected to the ungrounded ends of resistors 37 and 38. The common cathode lead of tube 39 is connected through a bias resistor 39' to ground. Resistors 42, 42' of high magnitude are inserted between the plates and grids of the respective triodes, to improve the stability of the amplifiers. The plates 43, 43' are respectively connected to the opposite ends of output resistors 44 and 44'. The midpoint of resistors 44 and 44' is connected to a direct current supply lead 45, and the opposite ends of the output resistors 44 and 44' are connected to the respective control grids of the tubes 46 and 47. Resistors 44 and 44' are shunted by resistors 48 and 48', whose adjacent terminals are connected to bias-adjusting potentiometer 50 by the common cathode resistor 49. Potentiometer 50 and bias resistor 49 are bypassed from each cathode of tubes 46 and 47.

The midpoint of resistors 48 and 48' is connected by lead 51 to one end of secondary winding 52 of the 60 cycle energizing source transformer 53. The primary winding 54 is connected to a suitable 60 cycle alternating current source. The lead 55 connects the opposite end of secondary winding 52 to the respective screen grids and plates of tubes 46 and 47.

The tubes 46 and 47 provide a 60 cycle balanced modulator circuit. The plates 56 and 57 are connected to opposite ends of primary winding 58 of output transformer 59, while lead 55 is connected to the midpoint of winding 58. The screen grids 60 and 61 of respective tubes 46 and 47 are connected in parallel relation to lead 55. Accordingly, the 60 cycle voltage is applied in like phase to screen grids 60 and 61, and the voltage is, also, applied in like phase to the plates 56 and 57. The resistance-condenser paths 62 and 63 are each connected from respective plates 56 and 57 to respective control grids 64 and 65. These paths 62 and 63 are stabilizing paths. They are negative feedback paths for 60 cycle voltage, and prevent the 60 cycle voltages from affecting the control grids 64 and 65.

By adjusting the balance of the modulator tubes 46 and 47, as by adjustment of bias resistor 49 on potentiometer 50, a minimum of 60 cycle output voltage is developed across the secondary winding of transformer 59 when the output from the direct current voltage amplifier 39 is zero. It will be noted that when equal direct current voltages are applied to grids 40 and 41, then the output of tube 39 will be zero. Therefore, the control grids 64 and 65 will have like effects on the space currents in each of tubes 46 and 47. This means that in each of tubes 46 and 47 the space current will be under control of the respective screen grid voltage and plate voltage. These are in like phase in each tube 46 and 47. Hence, the 60 cycle currents in each half of winding 58 will be equal, and cancel or balance out due to the push-pull output connection. This means that a minimum of 60 cycle voltage appears at the secondary circuit 66.

If, however, the energy at the input of AFC detector 36 deviates in frequency from 2.5 kc., the voltages across resistors 37 and 38 will become unequal and will be applied in amplified form to grids 64 and 65. This will result in an unbalance in the output circuit 58, and 60 cycle voltage will develop across secondary circuit 66 whose magnitude and phase are respectively dependent on the extent and sense of the aforesaid frequency deviation from the reference frequency of 2.5 kc. Hence, tubes 46 and 47 function as a source of 60 cycle voltage of variable phase and magnitude responsive to relatively slight frequency deviations of the 2.5 kc. control signal.

The 60 cycle voltage of variable phase and magnitude may be suitably amplified prior to control utilization. While I have shown one form of 60 cycle voltage amplifier between circuit 66 and AFC lead 67, it is to be clearly understood that any other suitable and known form of amplifier may be introduced into the dotted rectangle 70. Specifically, I have shown push-pull amplifier tubes 71 and 72 fed from the single-ended output circuit 66 by amplifier tube 73 and phase inverter tube 74. The input electrodes of tube 73 are coupled across potentiometer 75 to adjust the level of 60 cycle voltage applied to the amplifier system.

Phase inversion tube 74 has its control grid coupled to an intermediate point on resistors 80, 80' and 80'', and the plates of tubes 73, 74 are connected in push-pull to the output resistors 81 and 81'. The control grids of push-pull amplifier tubes 71 and 72 are tied to opposite ends of resistors 80, 80' and 80'' in series, and are coupled by suitable capacitors to the plate ends of output resistors 81 and 81'. The screen grids and plates of the tubes 71 and 72 are connected to direct current supply lead 45. The output voltage of tubes 71 and 72 is developed through transformer 83 across secondary circuit 83'. The latter winding is connected in a closed circuit including energizing coil 84 of a two-phase motor M having a suitable driving connection to the variable condenser 7.

The numeral 82 denotes the rotor of the motor M. The two-phase motor may be of any suitable and known type, and it is schematically represented since those skilled in the art are well acquainted with the construction thereof. The energizing windings of motor rotor 82 are represented by numerals 84 and 85. Winding or coil 85 is connected in a 60 cycle energizing circuit, as is winding 84. Preferably the windings 84 and 85 may be wound on a common iron core, and each carries 60 cycle current derived from the 60 cycle current source 54. The winding 85 is connected to be energized from source 54. One end of winding 85 is connected by lead 86 to the upper end of secondary 87, the lower end of the latter being connected to ground by phase shifter condenser 88. The grounded end of motor winding 85 returns to the grounded terminal of condenser 88.

The rotor 82 may be suitably coupled by any mechanical device to the adjustable element of tuning condenser 7. It is sufficient for the purpose of this present application to point out that rotary motion of motor rotor 82 is translated into an adjustment of the capacitance of condenser 7. The sense and magnitude of capacitance adjustment will be respectively dependent on the direction and degree of rotation of rotor 82. The motion of the latter, of course, depends on the relations between the 60 cycle currents flowing in windings 84 and 85.

In explaining the operation of the two-phase motor M, it is first pointed out that 60 cycle current must flow through windings 84 and 85 in or order to actuate the motor rotor, or armature, 82. Again, these 60 cycle currents must be in phase quadrature to energize the rotor. The 60 cycle current flowing through coil 85 is derived directly from source 54, but the condenser 88 is so chosen in value as to provide a 90 degree phase shift in the 60 cycle current flowing through winding 85. Appearance of 60 cycle current in winding 84, then, automatically starts the motor. However, the appearance of 60 cycle current in winding 84 depends entirely on the frequency of the energy applied to the AFC detector input terminals. It has been previously explained that if the energy passing filter 34 has a frequency of 2.5 kc., then the output voltages across resistors 37 and 38 will be equal. Deviations from 2.5 kc. will cause the voltages across resistors 37 and 38 to vary correspondingly. Hence, the 60 cycle current will not appear in lead 67 unless deviation from 2.5 kc. occurs at the input terminals of AFC detector 36.

The 60 cycle current flowing through lead 67 will have a value and phase dependent respectively upon the extent and sense of frequency deviation from 2.5 kc. In this way there is provided a method of controlling the frequency of tank circuit 6 in response to frequency deviations of the output of low pass filter 34 from the reference frequency of 2.5 kc. The adjustment of condenser 7 will, of course, be such as to correct for any frequency deviation from 2.5 kc. The operation of the two-phase motor M, then, causes the beat frequency at the output of detector 4 to change until the frequency deviation, which caused motor operation, vanishes. Accordingly, whatever the cause of frequency deviation of the 10 kc. component, whether it be caused by signal drift and/or oscillator drift, the AFC action described herein will automatically correct the oscillator 5 to maintain the correct oscillator frequency for the second detector 4.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a radio receiver of the type adapted selectively to detect signals in the form of single side band modulated carrier energy wherein the carrier is at least partially suppressed; the method which includes suppressing all frequency components of the detected modulated energy except those included in the single side band, generating local oscillations whose frequency is equal to the detected frequency representative of the suppressed carrier component frequency, beating the detected side band components with the local oscillations thereby to provide modulation frequencies corresponding to those originally applied to the carrier, said local oscillations being generated by generating stable oscillations of relatively low frequency and by frequency multiplying the stable oscillations to provide said local oscillations, separately frequency multiplying the stable oscillations to provide auxiliary oscillations of a lower frequency than said carrier-representative frequency, filtering from said modulated energy the carrier-representative component, combining the filtered carrier-representative component with the auxiliary oscillations to produce a relatively low beat frequency, and automatically correcting in response to said beat frequency for deviations in carrier frequency from a predetermined reference value.

2. In a system for receiving high frequency signals having the form of upper and lower modulation side bands of different character and a carrier component which is at least partially suppressed, the method which includes generating local oscillations differing from the carrier component frequency by a relatively low difference frequency, combining the signals and local oscillations to produce beat energy in the form of a carrier component of said difference frequency and provided with upper and lower side bands corresponding to the aforesaid side bands, generating stable oscillations of a frequency lower than said low difference frequency, multiplying the stable oscillation frequency to a value equal to said difference frequency, deriving from the beat energy a pair of energies respectively representative of the upper and lower side bands thereof, and separately beating the last-named derived energies with said frequency-multiplied stable oscillations to produce a pair of modulation signals of said different character.

3. In a system for receiving high frequency signals having the form of upper and lower modulation side bands of different character and a carrier component which is at least partially suppressed, the method which includes generating local oscillations differing from the carrier component frequency of the received signals by a relatively low difference frequency, combining the signals and local oscillations to produce beat energy in the form of a carrier component of said difference frequency and provided with upper and lower side bands corresponding to the aforesaid side bands, generating stable oscillations of a frequency lower than said low difference frequency, multiplying the stable oscillation frequency to a value equal to said difference frequency, deriving from the beat energy a pair of energies respectively representative of the upper and lower side bands thereof, separately beating the last-named derived energies with said frequency-multiplied stable oscillations to produce a pair of modulation signals of said different character, separating from the beat energy the carrier component thereof free of its said side bands, beating the separated beat carrier component with oscillations derived from the stable oscillations, deriving from the last beating step a low frequency control energy, translating frequency deviations of the latter control energy into corresponding direct current voltage variations, and automatically correcting the frequency of said first local oscillations in response to said direct current voltage variations.

4. In a radio receiver of the type adapted to detect signals in the form of single side band modulated carrier energy wherein the carrier is suppressed; the method which includes suppressing all frequency components of the modulated energy except those included in the single side band, generating stable oscillations of relatively low frequency, frequency multiplying the stable oscillations to provide local oscillations whose frequency is equal to the suppressed carrier, beating the residual side band components with the local oscillations thereby to provide modulation frequencies corresponding to those originally applied to the carrier, separately frequency multiplying the stable oscillations to provide auxiliary oscillations of a lower frequency than said carrier frequency, filtering from said modulated energy the carrier component, combining the filtered carrier component with the auxiliary oscillations to produce a relatively low beat frequency, and automatically in response to said beat frequency correcting for deviations in carrier frequency from a predetermined reference value.

5. In a system for receiving high frequency signals having the form of upper and lower modulation side bands of different character and a carrier component which is at least partially suppressed, the method which includes deriving from the signals energy in the form of a carrier component of reduced frequency and provided with upper and lower side bands corresponding to the aforesaid side bands, generating stable oscillations of a frequency lower than said reduced frequency, multiplying the stable oscillation frequency to a value equal to said reduced frequency, deriving from the reduced frequency energy a pair of energies respectively representative of the upper and lower side bands thereof, separately beating the last-named derived energies with said frequency-multiplied stable oscillations to produce a pair of modulation signals of said different character, separating from the reduced frequency energy the carrier component thereof free of its said side bands, beating the separated carrier component with oscillations derived from the stable oscillations, deriving from the last beating step a low frequency control energy, translating frequency deviations of the latter control energy into corresponding direct current voltage variations, and automatically correcting frequency shift of said reduced frequency energy in response to said direct current voltage variations.

6. In apparatus for receiving high frequency signals comprising a carrier and upper and lower side bands of different character resulting from modulation of the carrier by a signal, a source of local oscillations the frequency of which differs from said carrier frequency by a relatively low difference frequency, a mixer excited by oscillations from said source and by the signals for producing beat energy in the form of a carrier component of said difference frequency and upper and lower side bands corresponding to the first mentioned side bands, a source of oscillatory energy of stable frequency which is of lower frequency than said low difference frequency, a frequency multiplier coupled with said last named source to multiply the frequency thereof to a value equal to said difference frequency, selective circuits coupled to said mixer for deriving from the beat energy, energies representing respectively the upper and lower side bands thereof, a frequency converter for each of said selective circuits with a coupling between each converter and its selective circuit, a coupling between said multiplier and each of said converters for feeding thereto said frequency multiplied oscillations of stable frequency, and an output connection for each of said converters.

7. In radio apparatus adapted to amplify and detect signals in the form of a carrier and a single side band resulting from modulation of the carrier by signals, a carrier suppressor filter excited by said carrier and side band for deriving side band energy from which all frequency components except those included in the side band have been removed, an oscillation generator of substantially fixed and relatively low frequency, a frequency multiplier coupler to said last named oscillation generator for deriving multiplied energy of fixed frequency whose frequency is equal to the suppressed carrier, a frequency converter coupled to said frequency multiplier and to said filter for mixing said selected side band components with the frequency multiplied oscillations to provide modulation frequencies corresponding to the modulation used to modulate said first named carrier, a separate frequency multiplier coupled to said source of oscillations of low and stable frequency to provide auxiliary oscillations of a frequency lower than said first named carrier frequency, a filter excited by said first named carrier and side band energy for deriving carrier component energy only, a modulator stage coupled to said last named filter and said last named frequency multiplier for mixing the said filtered carrier with multiplied oscillations to derive a new beat note of a frequency which varies only in the event the frequency of said first named carrier varies, and automatic frequency control means coupled to said last named modulator for producing a control potential to correct variations in the frequency of said first named carrier.

HARRY SUSSMAN.

REFERENCES CITED

The following references are of record in the file of this patent:

UNITED STATES PATENTS

| Number | Name | Date |
|---|---|---|
| 1,942,561 | Mathieu | Jan. 9, 1934 |
| 2,095,050 | Beverage | Oct. 5, 1937 |
| 2,273,023 | Bellescize | Feb. 17, 1942 |

FOREIGN PATENTS

| Number | Country | Date |
|---|---|---|
| 392,567 | Great Britain | May 18, 1933 |

OTHER REFERENCES

"Single-Sideband Short-Wave Receiver," Bell Laboratories Record, November 1939, pages 84, 85, 86 and 87.